No. 811,282. PATENTED JAN. 30, 1906.
E. ERIKSSON.
FLOOR SCRAPER.
APPLICATION FILED DEC. 20, 1904.
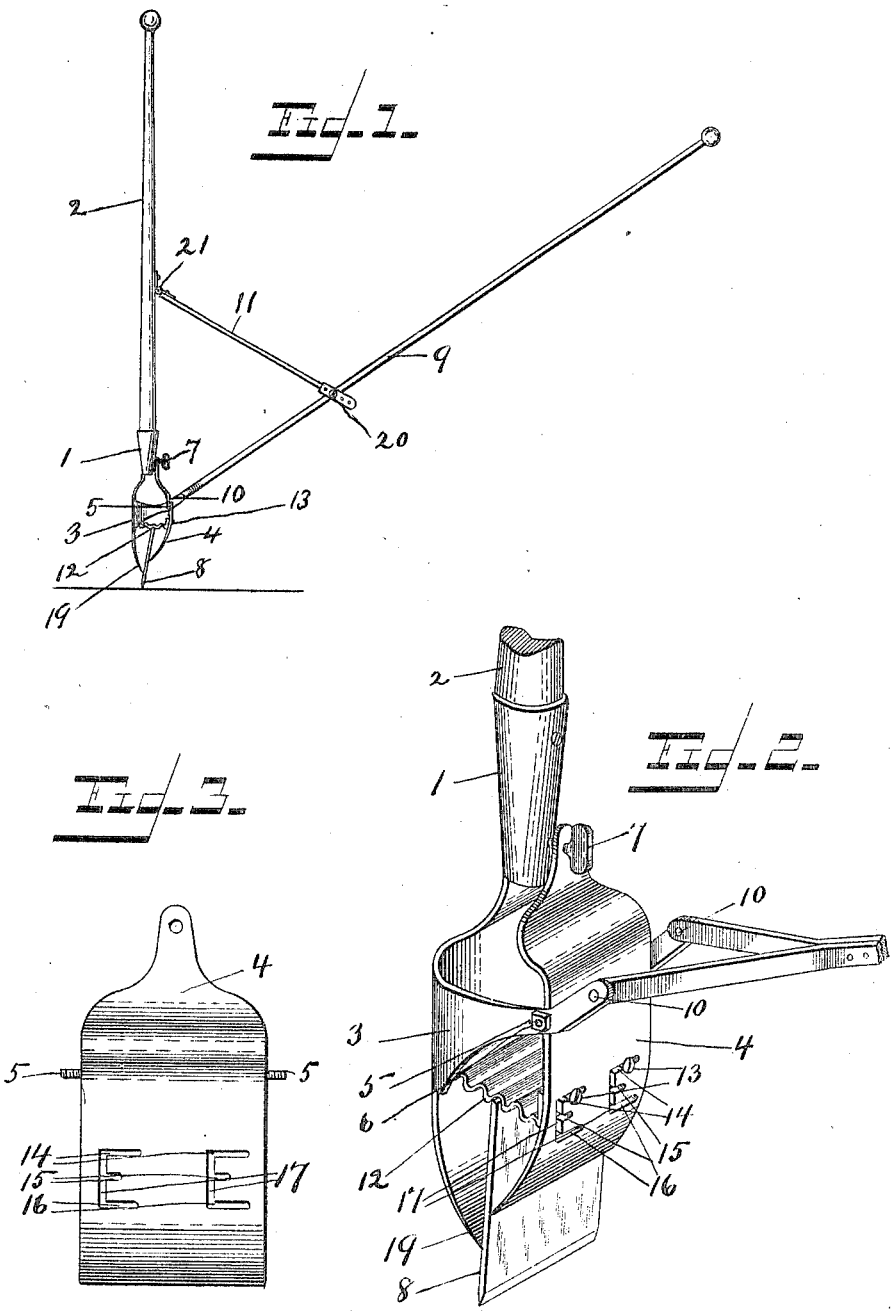
Witnesses
Franck L. Ourand.
W. N. Ourand.
Inventor
Erik Eriksson,
by John A. Saul.
Attorney

UNITED STATES PATENT OFFICE.

ERIK ERIKSSON, OF ODEBOLT, IOWA, ASSIGNOR OF ONE-HALF TO OSCAR E. HUGLIN, OF ODEBOLT, IOWA.

FLOOR-SCRAPER.

No. 811,282.  Specification of Letters Patent.  Patented Jan. 30, 1906.

Application filed December 20, 1904. Serial No. 237,663.

*To all whom it may concern:*

Be it known that I, ERIK ERIKSSON, a citizen of the United States, residing at Odebolt, in the county of Sac and State of Iowa, have invented certain new and useful Improvements in Floor-Scrapers, of which the following is a specification.

My invention relates to tools or devices for scraping the surfaces of floors and the like, and has for its object to so construct the same that it may be easily and cheaply manufactured, be efficient in operation, and may be easily manipulated.

In the drawings forming a part of this specification, and in which like symbols of reference represent corresponding parts in the several views, Figure 1 is a side view of the device as it appears in operation; Fig. 2, a perspective view of the scraper proper, and Fig. 3 a view of a detached portion of the scraper.

1 represents the socket to receive the vertical handle 2; 3, wings to hold the front plate 4 by means of lugs 5 and nuts 6, and 7 a thumb-screw to clamp scraper 8 by operating same and compressing end of plate 4.

9 is an oblique handle connected at 10 to wings 3 and to the vertical handle 2 by brace 11.

12 is a corrugated strip connected to the front plate 4 by means of screws 13, operating in slots 14, 15, and 16 and adapted to be adjusted from one to the other of said horizontal slots through the medium of the vertical slot 17.

8 is the scraper, having its end resting in one of the recesses of strip 12 and clamped between the front plate 4 and the point 19. The front plate 4 is made slightly shorter than the rear plate 19 to prevent vibration of the scraper 8.

20 is a thumb-screw working in a slot in brace 11, and 21 a hinge connecting said brace to handle 2, so that said vertical handle may be adjusted with relation to the oblique handle 9 or may be folded against the same, if desired.

The operation is as follows: The handles being adjusted as desired, one person draws the scraper toward him by handle 9, while the other bears upon handle 2. The scraper 8 may be adjusted to the desired plane or removed by loosening screw 7 and changing the rear of scraper in the recesses.

Having now fully described my invention, what I claim as new, and desire to secure by Letters Patent, is—

1. In a floor-scraper, a vertical handle, a socket-provided plate connected to the same, lateral wings extending from the plate, an adjustable plate connected to the wings, said plate having an eye at its upper portion, a scraper between the plates, and a thumb-screw working through the eye of the adjustable plate and contacting with the socket of the device for the purpose of clamping the scraper.

2. In a floor-scraper, a vertical handle, a plate connected to the same, wings extending from the plate, an adjustable plate connected to the wings, a scraper between the plates, a horizontal plate to receive the rear of the scraper, a series of slots in the adjustable plate, and screws working in the slots, by means of which the horizontal plate may be adjusted.

3. In a floor-scraper, a vertical handle, a plate connected to the same, lateral wings extending from the plate, an adjustable plate connected to the wings, a scraper carried by the plates, a lateral handle adjustably connected to the outer portions of the wings, and a brace hinged to the vertical handle and having locking means for connecting it to the lateral handle, by means of which the two handles may be locked at various angles, or the handles may be released and folded against each other.

4. In a floor-scraper, a plate having lateral wings extending from the same, an adjustable plate carried by the wings, a scraper adapted to be held between the two plates, and an adjustable corrugated plate carried by the adjustable plate and adapted to receive the rear of the scraper.

In testimony whereof I affix my signature in presence of two witnesses.

ERIK ERIKSSON.

Witnesses:
 J. W. ENGSTROM,
 A. E. BAKER.